(12) United States Patent
Sasaki

(10) Patent No.: US 10,542,203 B2
(45) Date of Patent: Jan. 21, 2020

(54) ENCODER AND IMAGE CAPTURING APPARATUS

(71) Applicant: CANON PRECISION INC., Hirosaki-shi (JP)

(72) Inventor: Ryo Sasaki, Hirosaki (JP)

(73) Assignee: CANON PRECISION, INC., Aomori-Ken (JP)

( * ) Notice: Subject to any disclaimer, the term of this patent is extended or adjusted under 35 U.S.C. 154(b) by 39 days.

(21) Appl. No.: 16/010,279

(22) Filed: Jun. 15, 2018

(65) Prior Publication Data

US 2018/0367726 A1 Dec. 20, 2018

(30) Foreign Application Priority Data

Jun. 20, 2017 (JP) .................... 2017-120301

(51) Int. Cl.
*H04N 5/232* (2006.01)
*G06T 7/73* (2017.01)

(52) U.S. Cl.
CPC ........... *H04N 5/23212* (2013.01); *G06T 7/73* (2017.01)

(58) Field of Classification Search
CPC ... H04N 5/23212; G06T 7/73; G01D 5/34715
See application file for complete search history.

(56) References Cited

U.S. PATENT DOCUMENTS

2005/0017158 A1\* 1/2005 Kojima .............. G01D 5/34707
250/231.13

2012/0265484 A1\* 10/2012 Nagura .............. G01D 5/34746
702/150

(Continued)

FOREIGN PATENT DOCUMENTS

EP 3173746 A1 5/2017
JP 4476682 B2 6/2010

(Continued)

OTHER PUBLICATIONS

Extended European Search Report, for EP App. No. 18177185.8, dated Oct. 19, 2018.

(Continued)

*Primary Examiner* — Abdelaaziz Tissire
(74) *Attorney, Agent, or Firm* — Canon U.S.A., Inc. IP Division

(57) ABSTRACT

An encoder includes a scale having a pattern column with patterns periodically changing a physical characteristic, a detection element array disposed movable relatively to the scale and including detection elements configured to detect light from the pattern column are arranged in a moving direction, a signal processor configured to convert an output signal from the detection element array into position information. The detection element array includes first to fourth detection elements are arranged in order of the first detection elements, the second detection elements, the first detection elements, the second detection elements, the third detection elements, the fourth detection elements, the third detection elements, and the fourth detection elements. The signal processor generates a first signal based on an output signal from the first and third detection elements and a second signal based on an output signal from the second and fourth detection elements.

5 Claims, 14 Drawing Sheets

(56) References Cited

U.S. PATENT DOCUMENTS

| | | | |
|---|---|---|---|
| 2015/0233737 A1* | 8/2015 | Sasaki | ................ G01D 5/34707 250/231.1 |
| 2016/0180516 A1 | 6/2016 | Nagura | |
| 2017/0153129 A1* | 6/2017 | Sasaki | ................ G01D 5/34715 |

FOREIGN PATENT DOCUMENTS

| | | |
|---|---|---|
| JP | 5755010 B2 | 7/2015 |
| JP | 2015-152408 A | 8/2015 |
| JP | 2017-96848 A | 6/2017 |

OTHER PUBLICATIONS

OA corresponding JP Application, Application No. 2017-120301, dated May 8, 2018, English translation is attached.

* cited by examiner

ENCODER AND IMAGE CAPTURING APPARATUS

BACKGROUND OF THE INVENTION

Field of the Invention

The present invention relates to an encoder and an image capturing apparatus.

Description of the Related Art

It is important for a position detecting encoder to reduce an error in a signal for a higher position detecting accuracy. Japanese Patent No. ("JP") 4,476,682 discloses an encoder that can enhance an averaging effect at ends in which a signal intensity distribution significantly changes and reduce an error by making smaller each detection element (or detector) disposed at an end of a detection element (or detector) array than that disposed at the center of the detection element array. JP 5,755,010 discloses an encoder that can enhance a filtering effect of a spatial frequency component other than a basic wave component and reduce an error by weighting a detection element array in accordance with a position in the detection element array.

Where a spatial frequency that provides a maximum value to the spatial frequency response of the detection element array used to obtain a phase of a modulation period of a scale pattern approximately accords with the spatial frequency of a detection element array overall width, only one pair of detection elements generates the output signal for the detection element array overall width. In this case, since changing the detection element size and weighting in accordance with the position cannot be applied to the detection element array, the structures of JPs 4,476,682 and 5,755,010 cannot be used.

SUMMARY OF THE INVENTION

The present invention provides an encoder and an image capturing apparatus which can reduce errors caused by an influence of a signal intensity distribution and an influence of a spatial frequency component other than a basic wave.

An encoder according to the present invention includes a scale having a pattern column with a plurality of patterns for periodically changing a physical characteristic, a detection element array disposed movable relatively to the scale and including a plurality of detection elements configured to detect light from the pattern column are arranged in a moving direction, a signal processor configured to convert an output signal from the detection element array into position information. The detection element array includes first detection elements, second detection elements, third detection elements, and fourth detection elements. The first to fourth detection elements are arranged in order of the first detection elements, the second detection elements, the first detection elements, the second detection elements, the third detection elements, the fourth detection elements, the third detection elements, and the fourth detection elements. The signal processor generates a first signal based on an output signal from the first and third detection elements and a second signal based on an output signal from the second and fourth detection elements.

Further features of the present invention will become apparent from the following description of exemplary embodiments with reference to the attached drawings.

DESCRIPTION OF THE EMBODIMENTS

Figure 1:
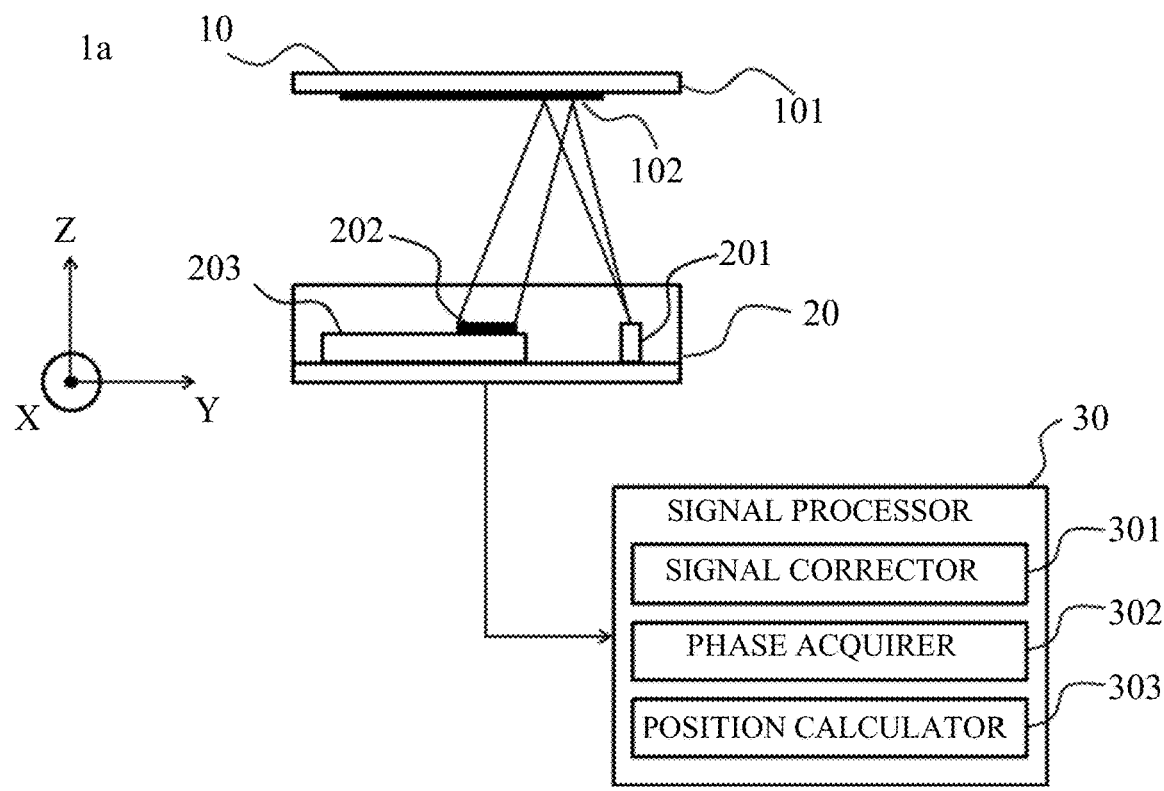
FIG. 1 illustrates a structure of an encoder according to a first embodiment.

Referring now to the accompanying drawings, a description will be given of embodiments according to the present invention. Corresponding elements in each figure will be designated by the same reference numerals, and a description thereof will be omitted.

First Embodiment

FIG. 1 illustrates a structure of an encoder 1a according to this embodiment. The encoder 1a includes a scale (or scaler) 10, a sensor 20, and a signal processor 30. The scale 10 is attached to an unillustrated fixed member, and movable relative to the sensor 20. The sensor 20 may be attached to an unillustrated fixed member, and movable relative to the scale 10. In other words, the encoder 1a may have a structure such that the scale 10 and the sensor 20 can move relative to each other.

The scale 10 includes a glass base 101, and a reflection film 102 as a chromium film patterned on the base 101. The scale 10 reflects light emitted from the sensor 20, and the reflected light again enters the sensor 20. The base 101 may be made of polycarbonate instead of glass. The reflection film 102 is not limited to the chromium film, and may include an aluminum film and a protective film for protecting the aluminum film. The reflection film 102 is patterned on a front surface of the base 101, but may be patterned on a back surface of the base 101 when the base 101 is made of a transparent material enough to transmit light. The present invention is not limited to the structure according to this embodiment as long as the light emitted from the sensor 20 again enters the sensor 20.

The sensor 20 includes a light source 201 configured to emit light to the scale 10, a detection element array (light receiver) 202 configured to receive light reflected on the scale 10, and a light receiving element 203 configured to convert the light received by the detection element array 202 into an electric signal. In other words, the sensor 20 receives the light emitted from the light source 201 and reflected on the scale 10, and converts the received light into the electric signal. This embodiment uses an LED for the light source 201. This embodiment uses a divergent light structure that does not dispose a collimator lens configured to collimate light between the scale 10 and the light source 201 for the scale 10 and sensor 20. The divergent light structure is a structure in which the light emitted from the light source travels with a uniform spread and without being collimated or condensed into one point. In this embodiment, the light source 201 and the detection element array 202 are equally distant from the scale 10, and thus the reflected image formed by the scale 10 is double enlarged in X and Y directions of the detection element 202. This embodiment uses a reflection type structure in which the sensor 20 receives light reflected on the scale 10, but the sensor 20 may receive light transmitting through the scale 10. This embodiment detects the light but may detect the magnetism or electricity.

The signal processor 30 includes a signal corrector 301, a phase acquirer 302, and a position calculator 303. The signal processor 30 includes an unillustrated amplifier, an unillustrated A/D converter, and an unillustrated interpolation processor.

The signal processor 30 processes and converts the signal output from the sensor 20 into position information. The signal corrector 301 corrects an offset error, an amplitude ratio error, and a phase difference error contained in the signal output from the sensor 20. The phase acquirer 302 calculates a phase in the signal acquired by the sensor 20 by performing an arctangent operation for the signal corrected by the signal corrector 301. The position calculator 303 accumulates phases calculated by the phase acquirer 302, and converts them into position information.

Figure 2:
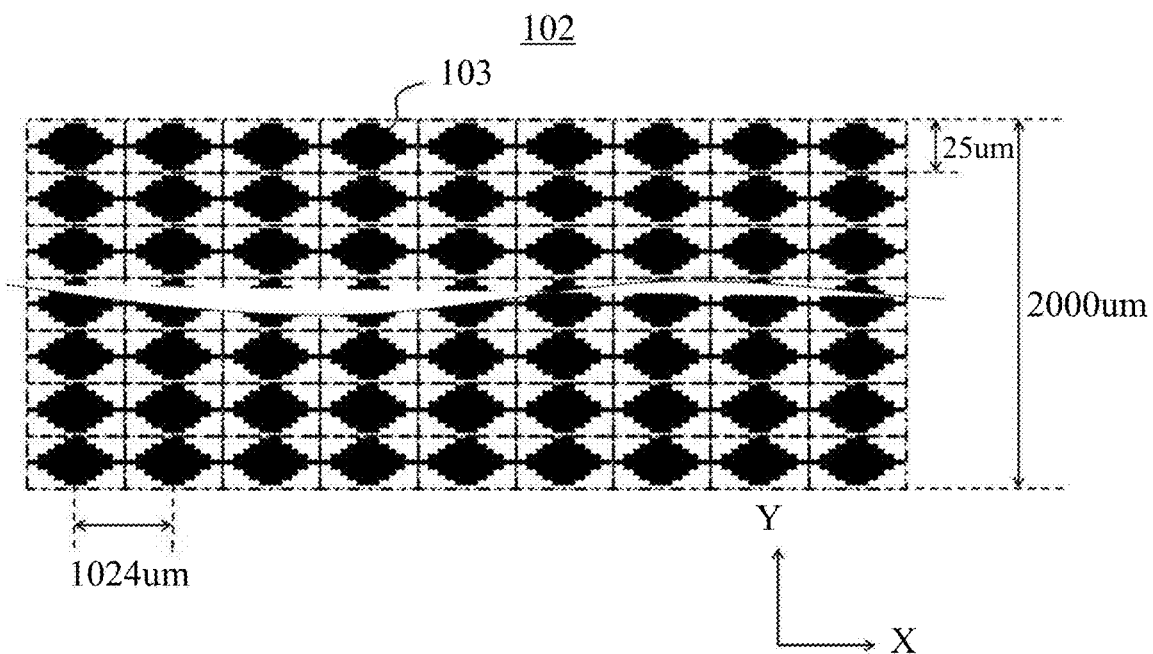
FIG. 2 illustrates a reflection film.
Figure 3:
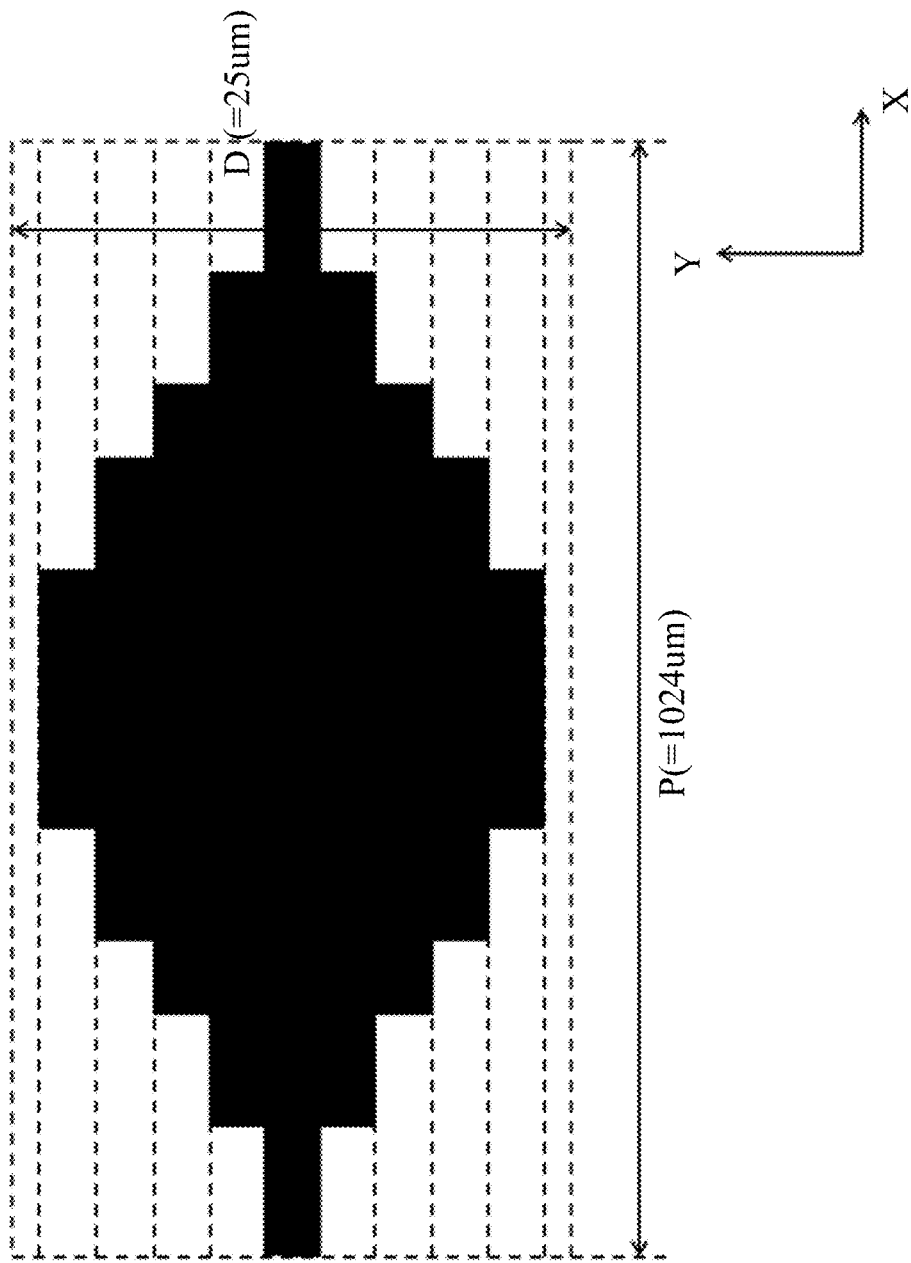
FIG. 3 illustrates an enlarged pattern.

FIG. 2 illustrates the reflection film 102 patterned on the scale 10. A black part represents patterned part of the reflection film 102, and a white part represents non-patterned part of the reflection film 102. The reflection film 102 includes a pattern column having a plurality of patterns 103. In this embodiment, the pattern 103 is distributed with a period of 1024 µm in the X direction and a period of 25 µm in the Y direction (with an overall length of 2000 µm in the Y direction). FIG. 3 is an enlarged view of the pattern 103. The pattern 103 is configured to periodically change its physical characteristic in a moving direction (X direction) of the scale 10. The light fluxes emitted from the light source 201 and reflected on the reflection film 102 are combined with each other, and the sine wave shaped reflected image is projected on the detection element array 202.

Figure 4:
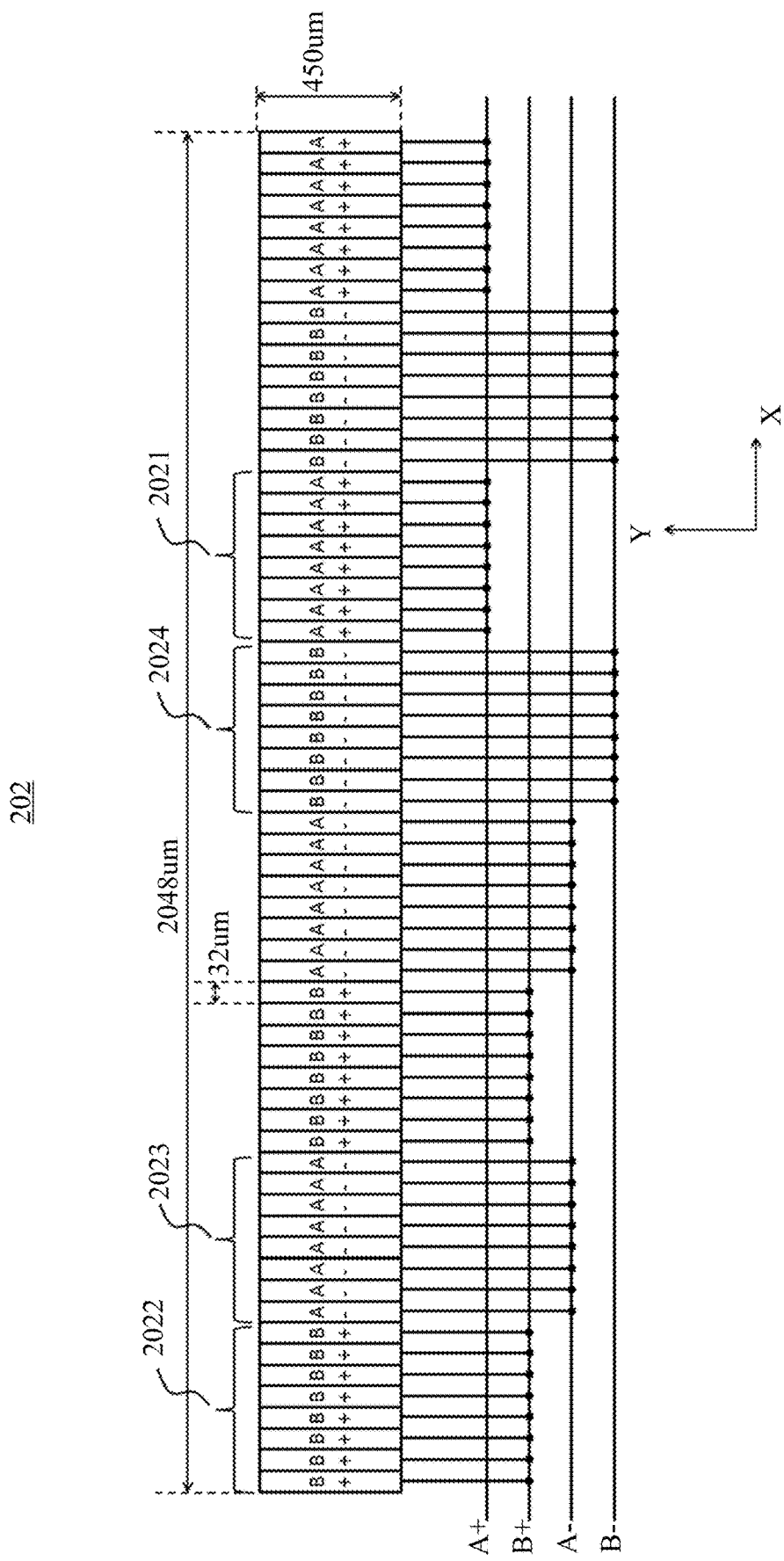
FIG. 4 illustrates a structure of a detection element array according to the first embodiment.

FIG. 4 illustrates a structure of the detection element array 202. In this embodiment, the detection element array 202 is 2048 µm long in the X direction, and 450 µm long in the Y direction. The detection element array 202 has a plurality of (64 in this embodiment) detection elements arranged in the moving direction of the scale 10, each of which has a length of 32 µm in the X direction. Since the encoder 1a according to this embodiment has a divergent light structure, the reflected image from the pattern 103 having a size of 1024 µm in the X direction has a size of 2048 µm on the detection element array 202. Thus, the detection element array 202 according to this embodiment can detect a sine wave signal for about one period. Each detection element has one of four electric connection attributes A+, B+, A−, and B−. Each of the detection elements 2021, 2022, 2023, and 2024 has a set of detection elements having one of the attributes A+, B+, A−, and B−. In this embodiment, the detection elements 2021, 2022, 2023, and 2024 are arranged so as to sandwich the detection elements 2024, 2023, 2022, and 2021. The detection elements 2021, 2022, 2023, and 2024 are connected to different connectors in the amplifier. In this embodiment, the amplifier outputs sine wave signals S(A+), S(B+), S(A−), and S(B−) with four phases or A+, B+, A−, and A− phases. When the sine wave signal S(A+) is set to a reference, the sine wave signals S(B+), S(A−), and S(B−) have relative phases of about +90°, about +180°, and about +270°, respectively. The signal processor 30 generates the A− phase signal S(A) and the B-phase signal S(B) as sine wave signals by using the following expressions (1) and (2):

$$S(A)=S(A+)-S(A-) \quad (1)$$

$$S(B)=S(B+)-S(B-) \quad (2)$$

Figure 5:
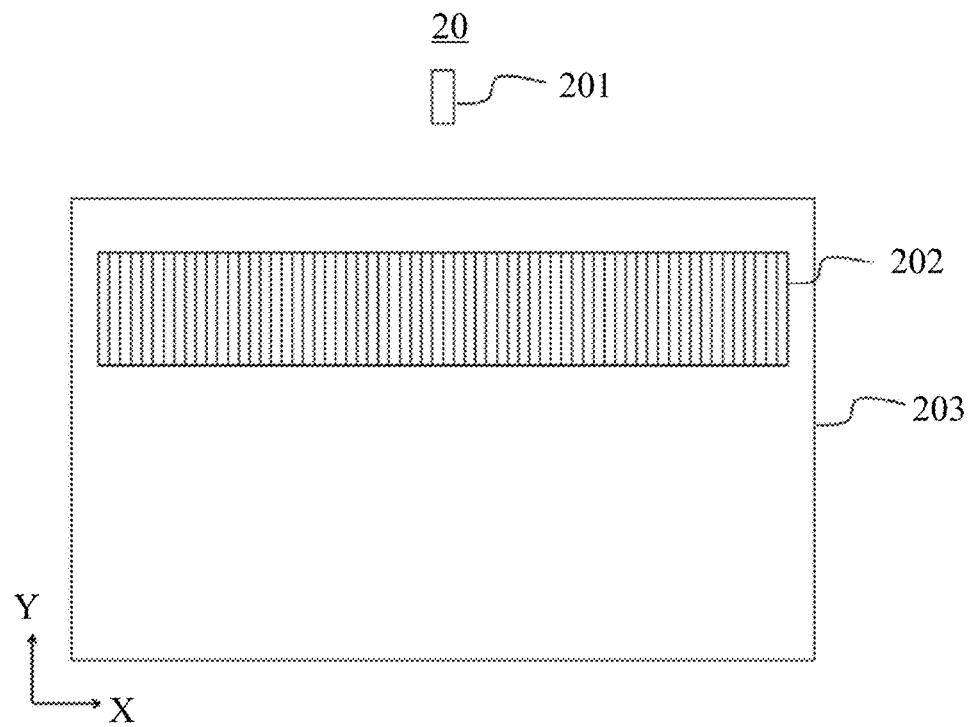
FIG. 5 is a top view of a sensor.
Figure 6:
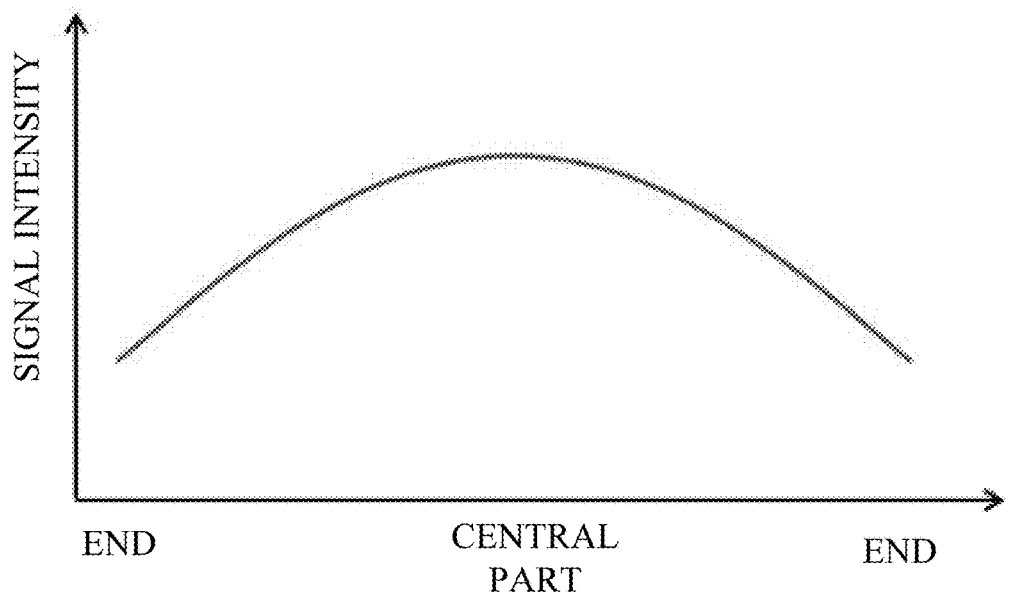
FIG. 6 illustrates an intensity distribution of a light signal that reaches the detection element array.

FIG. 5 is a top view of the sensor 20. The light source 201 is disposed at the center of the detection element array 202 in the X direction. The intensity of the light signal emitted from the light source 201 and entering the detection element array 202 is proportional to the distance, is highest at the central part of the detection element array 202, and becomes lower as the position approaches to the end, as illustrated in FIG. 6. In accordance with the expression (1), the A− phase signal S(A) offsets to the plus (or positive) side as the light signal reaching the detection elements 2021 has a high intensity and to the minus (or negative) side as the light signal reaching the detection elements 2023 has a high intensity. Similarly, in accordance with the expression (2), the B-phase signal S(B) offsets to the plus (or positive) side as the light signal reaching the detection elements 2022 has a high intensity and to the minus (or negative) side as the light signal reaching the detection elements 2024 has a high intensity.

Figure 7A:
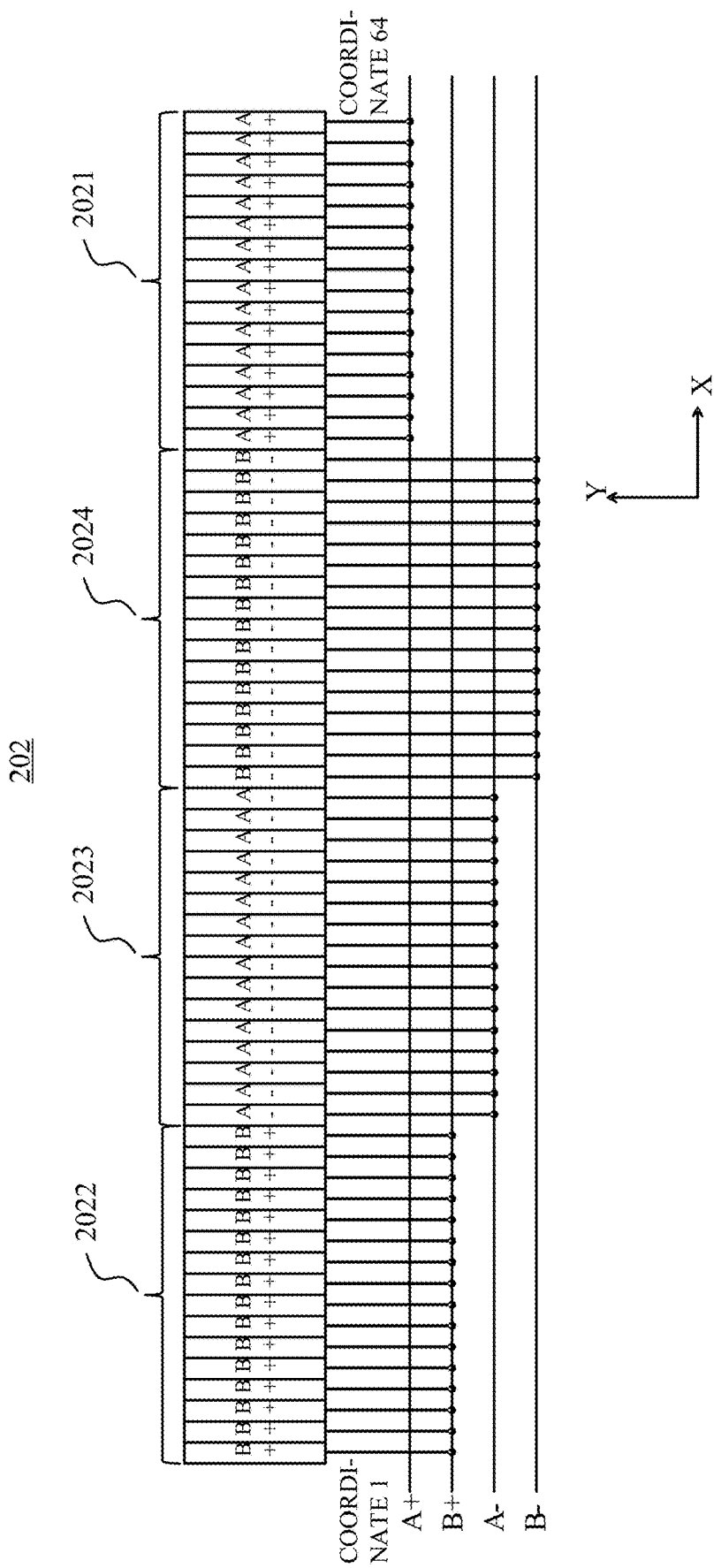
FIGS. 7A and 7B illustrate detection element arrays.
Figure 7B:
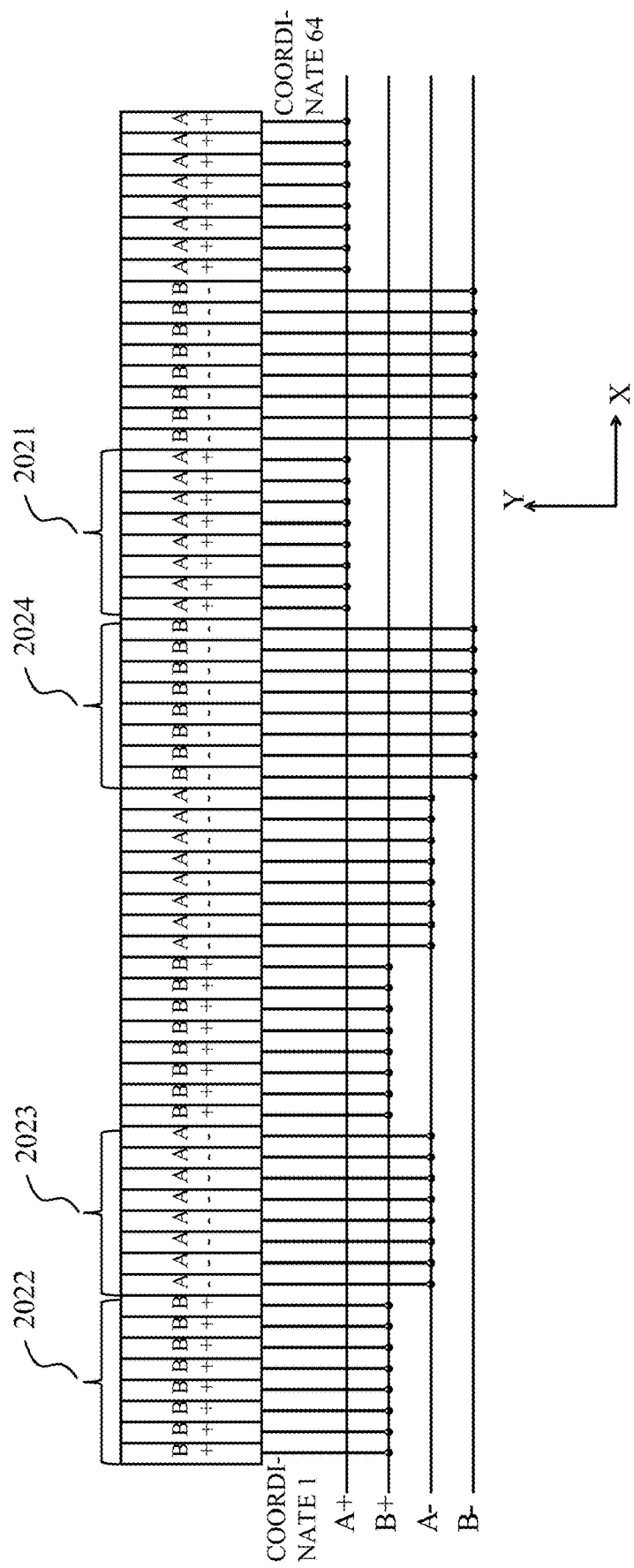

FIGS. 7A and 7B illustrate detection element arrays. FIG. 7A illustrates an array of a comparative example, and FIG. 7B illustrates an array of this embodiment. In the comparative example, the respective detection elements have a high uneven distribution rate. In other words, the detection elements 2021 and 2022 exist only at ends of the detection element array 202, and the detection elements 2023 and 2024 exist only at the central part of the detection element array 202. This embodiment arranges the detection elements 2022 and 2023 in an area (with coordinates 1 to 16) in which only the detection elements 2022 exist in the comparative example. The detection elements 2022 and 2023 exist in an area (with coordinates 17 to 32) in which only the detection elements 2024 exist in the comparative example. The detection elements 2021 and 2024 exist in an area (with coordinates 33 to 48) in which only the detection elements 2024 exist in the comparative example. The detection elements 2021 and 2024 exist in an area (with coordinates 49 to 64) in which the detection elements 2021 exist in the comparative example. Since the detection element array in the comparative example arranges the detection elements 2023 and 2024 at the central part which the light signal having a high signal intensity reach, both the A-phase signal S(A) and the B-phase signal S(B) offset to the minus side. On the other hand, the detection element array 202 according to this embodiment is less subject to the signal intensity distribution illustrated in FIG. 6 than the detection element array according to the comparative example. In particular, the structure of this embodiment can restrain the saturation influence on the plus or minus side which cannot be corrected by signal processing. Herein, the saturation means that the signal value beyond the limit value on the plus or minus side maintains the limit value. While this embodiment arranges the detection elements as illustrated in FIG. 7B, the present invention is not limited to this embodiment as long as the detection elements having different attributes are sandwiched.

Figure 8A:
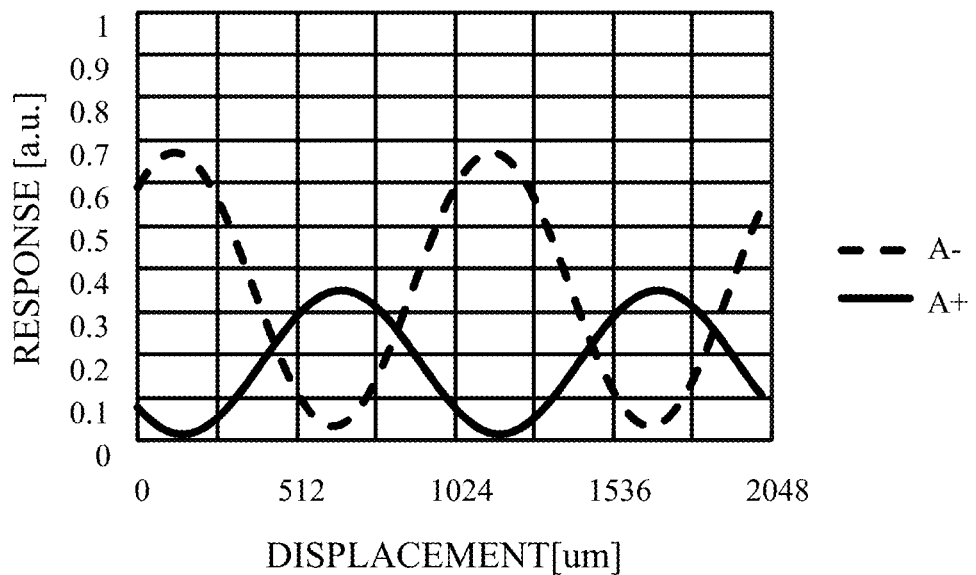
FIGS. 8A and 8B illustrate sine wave signals.
Figure 8B:
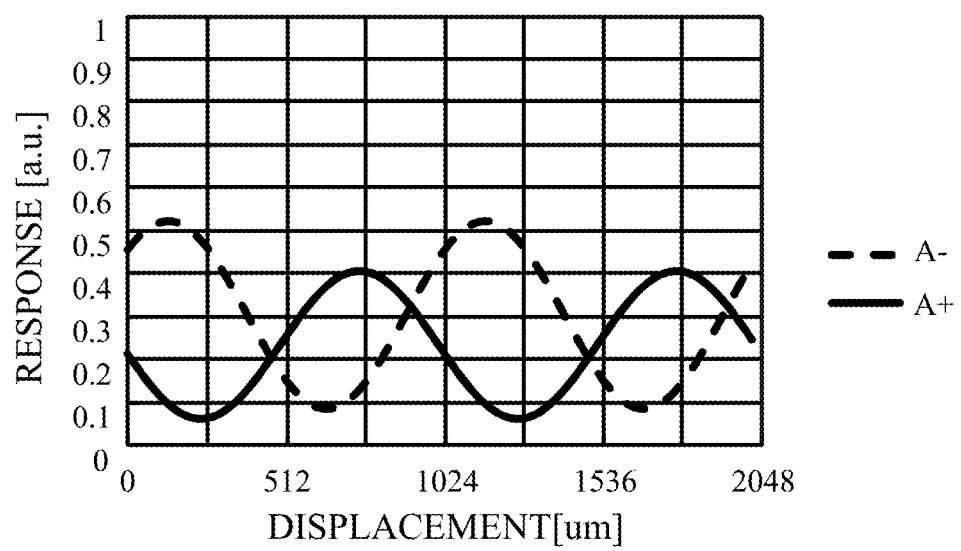
Figure 9A:
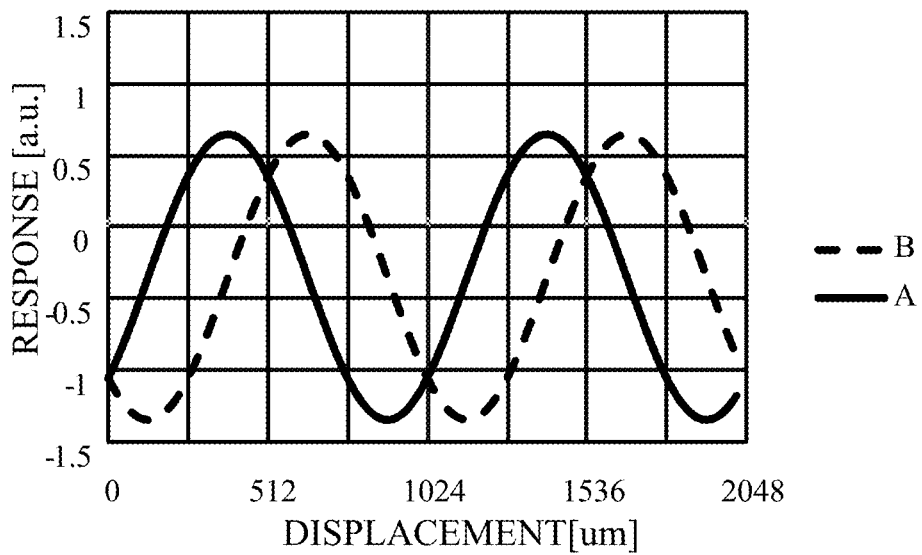
FIGS. 9A and 9B illustrate an A-phase signal and a B-phase signal.
Figure 9B:
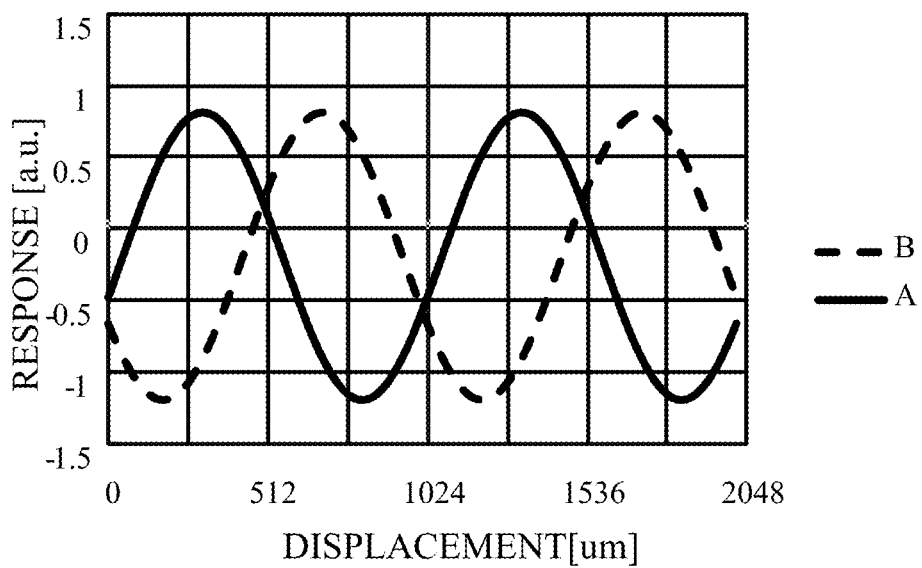

FIGS. 8A and 8B illustrate the sine wave signals S(A+) and S(A−). FIGS. 9A and 9B illustrate the A-phase signal S(A) and the B-phase signal S(B). FIG. 8A illustrates the sine wave signals S(A+) and S(A−) when the scale 10 is moved by 2048 μm relative to the detection element array in the comparative example illustrated in FIG. 7A. FIG. 9A illustrates the A-phase signal S(A) and the B-phase signal S(B) in case of FIG. 8A. FIG. 8B illustrates the sine wave signals S(A+) and S(A−) when the scale 10 is moved by 2048 μm relative to the detection element array 202 in this embodiment illustrated in FIG. 7B. FIG. 9B illustrates the A-phase signal S(A) and the B-phase signal S(B) in case of FIG. 8B. The signal intensity distribution illustrated in FIG. 6 is considered in either case. As illustrated in FIGS. 8A and 8B, this embodiment improves the intensity difference between the sine wave signals S(A+) and S(A−) in comparison with the comparative example. Although not shown, this is true of the sine wave signal S(B+) and S(B−). Thus, as illustrated in FIGS. 9A and 9B, the signal values of the A-phase signal S(A) and the B-phase signal S(B) in this embodiment become closer to the center (0) than those in the comparative example.

Figure 10A:
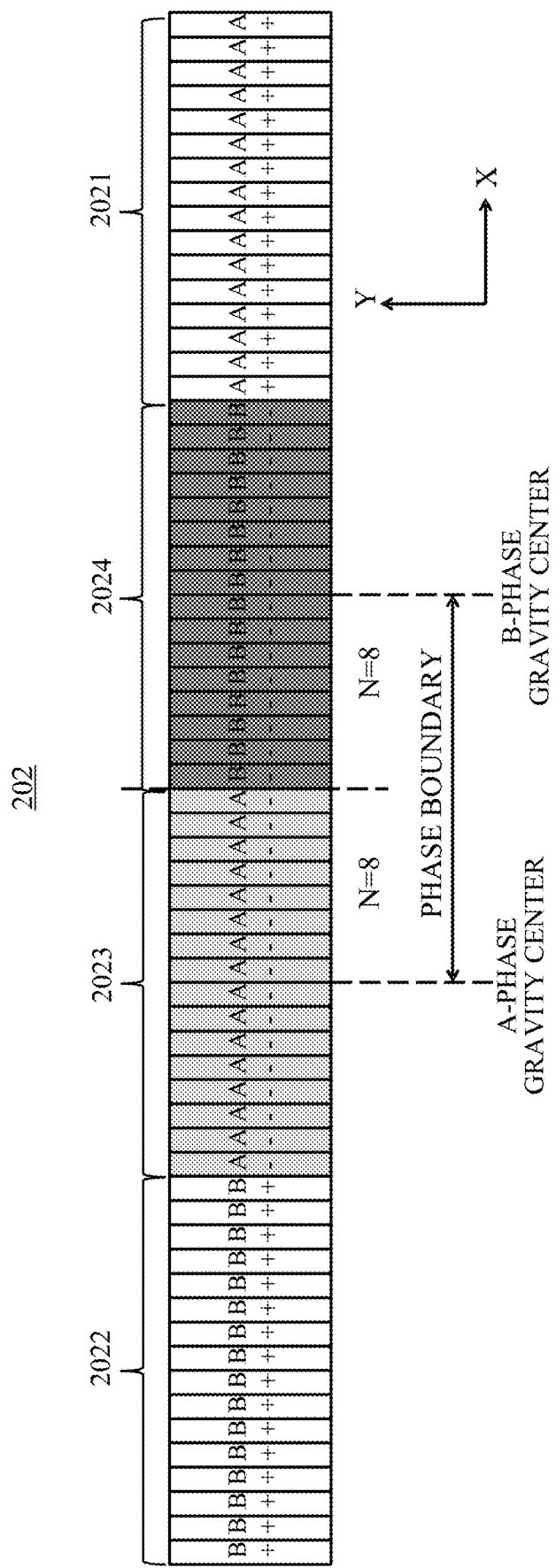
FIGS. 10A and 10B illustrate a difference of a center of gravity between the detection elements.
Figure 10B:
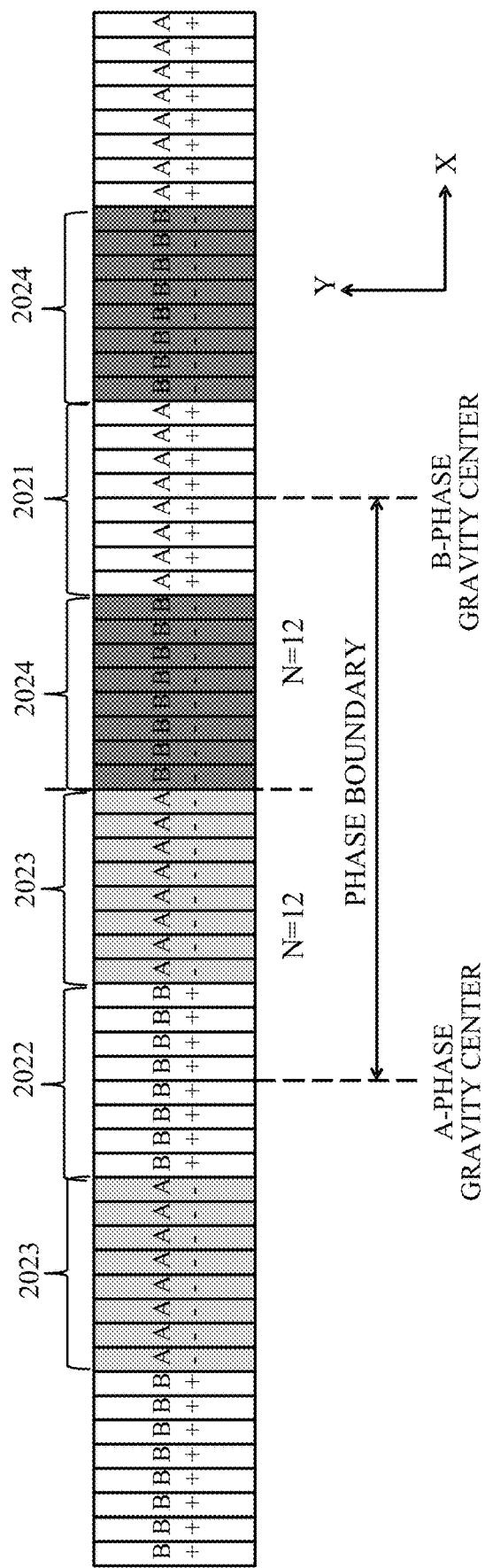

Referring now to FIGS. 10A and 10B, a description will be given of phase difference changes of the A phase and the B phase according to the present invention. FIGS. 10A and 10B illustrate a difference of a center of gravity (gravity center) in the detection elements. FIG. 10A illustrates a phase relationship between the detection elements 2022 and 2023 in the detection element array according to the comparative example. FIG. 10B illustrates a phase relationship between the detection elements 2022 and 2023 in the detection element array 202 according to this embodiment.

In each of the comparative example and this embodiment, the phase boundary between the detection elements 2023 and 2024 is located at the center of the detection element array. In FIG. 10A, the phase gravity centers in the detection elements 2023 and 2024 are located at the centers of the respective detection elements. In FIG. 10B, the respective detection elements 2023 and 2024 are discretely arranged so as to sandwich the detection elements 2022 and 2021. Thus, in FIG. 10B, the phase gravity centers in the detection elements 2023 and 2024 are located at the centers of the respective detection elements 2022 and 2021. In other words, this embodiment shifts the phase gravity centers of the detection elements 2023 and 2024 closer to the ends from the phase boundary than the comparative example. In FIG. 10A, there are eight detection elements between the phase boundary and the phase gravity center of each of the detection elements 2023 and 2024. Thus, there are sixteen detection elements between the phase gravity centers of the detection elements 2023 and 2024. In FIG. 10B, there are twelve detection elements between the phase boundary and the phase gravity center of each of the detection elements 2023 and 2024. Thus, there are twenty-four detection elements between the phase gravity centers of the detection elements 2023 and 2024.

A phase difference between the A-phase signal S(A) and the B-phase signal S(B) is expressed as follows where Nseg is the number of detection elements in the detection element array, and Diffseg is the number of detection elements between the phase gravity centers of the respective phases:

$$360° \times \frac{Diffseg}{Nseg} \quad (3)$$

Since Nseg is 64 and Diffseg is 16 in FIG. 10A, a phase difference between the A-phase signal S(A) and the B-phase signal S(B) is calculated as 90° based on the expression (3). Since Nseg is 64 and Diffseg is 24 in FIG. 10B, a phase difference between the A-phase signal S(A) and the B-phase signal S(B) is calculated as 135° based on the expression (3). The phase difference of 135° enables the position to be detected, but may be corrected to 90° for more accurate position detections.

A description will now be given of a method for generating the position information based on the A-phase signal S(A) and the B-phase signal S(B) in which a phase difference is corrected. The signal corrector 301 initially corrects a phase difference error between the A-phase signal S(A) and the B-phase signal S(B). The A-phase signal S(A) and the B-phase signal S(B) in which a phase difference is shifted from 90° can be expressed as follows where e is the phase difference error:

$$S(A) = \cos(\theta + e/2) \quad (4)$$

$$S(B) = \sin(\theta - e/2) \quad (5)$$

The phase difference error e can be separated through an addition and a subtraction between the A-phase signal S(A) and the B-phase signal S(B) as follows:

$$S(A) + S(B) = 2 * \cos\left(\theta - \frac{\pi}{4}\right)\sin\left(\frac{e}{2} - \frac{\pi}{4}\right) \quad (6)$$

$$-S(A) + S(B) = 2 * \sin\left(\theta - \frac{\pi}{4}\right)\cos\left(\frac{e}{2} - \frac{\pi}{4}\right) \quad (7)$$

Since sin(e/2−π/4) in the expression (6) and cos(e/2−π/4) in the expression (7) are constants, the correction signals S(A)' and S(B)' that have no phase difference error can be calculated as follows where a phase θ−π/4 is a phase φ:

$$S(A)' = \frac{S(A) + S(B)}{2 * \sin\left(\frac{e}{2} - \frac{\pi}{4}\right)} = \cos(\phi) \quad (8)$$

$$S(B)' = \frac{-S(A) + S(B)}{2 * \cos\left(\frac{e}{2} - \frac{\pi}{4}\right)} = \sin(\phi) \quad (9)$$

This embodiment sets the phase difference error e to 22.5° based on the designed value of the detection element array 202. Thus, the signal corrector 301 corrects a phase difference by setting the phase difference error e to 22.5°. This embodiment uses a constant for a divided value for the correction, but may determine the divided value by calculating a peak and a bottom of the left side S(A)+S(B) in the expression (6) and the left side −S(A)+S(B) in the expression (7) if the real-time correction is required.

The phase acquirer 302 performs an arctangent operation expressed in the following expression (10) by using the correction signals S(A)' and S(B)' output from the signal corrector 301.

$$\phi = \text{ATAN2}(S(A)', S(B)') \quad (10)$$

The position calculator 303 detects a relative displacement by integrating a change of the phase φ. Since the phase φ proceeds to 2π and then returns to 0, the determination processing expressed by the following expression (11) is necessary in calculating the phase change.

$$\text{diff} = \begin{cases} \phi_n - \phi_{n-1} & (-\pi \leq \phi_n - \phi_{n-1} \leq \pi) \\ \phi_n - \phi_{n-1} + 2\pi & (\phi_n - \phi_{n-1} < -\pi) \\ \phi_n - \phi_{n-1} - 2\pi & (\phi_n - \phi_{n-1} > \pi) \end{cases} \quad (11)$$

Herein, $\varphi_n$ is the latest phase, $\varphi_{n-1}$ is one phase before the latest phase, and diff is a difference between them. The position calculator 303 accurately acquires position information by accumulating the difference diff.

Figure 11:
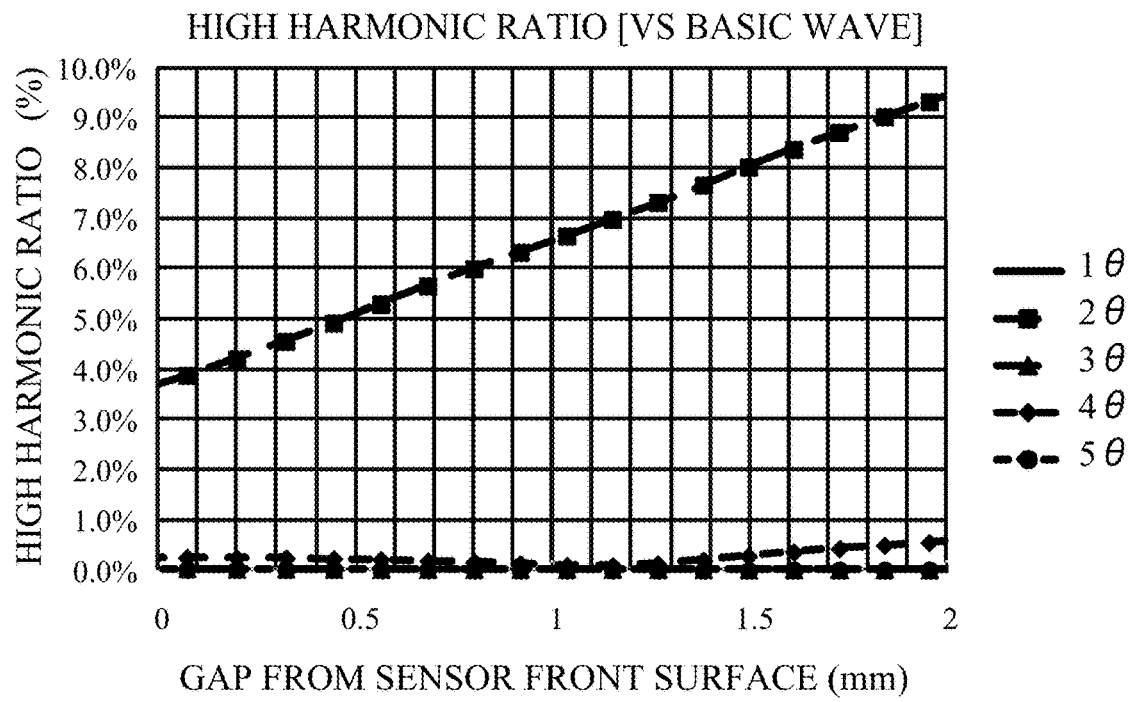
FIG. 11 illustrates a frequency characteristic of reflected light from a scale.

Next follows a description of a filtering effect of an error in a spatial frequency component that is about twice as high as the spatial frequency of the basic wave. FIG. 11 illustrates the spatial frequency characteristic of the reflected light from the scale 10 for each order. Where the basic wave is set to 1θ, other spatial frequency components of integer multiples are set to 2×, 3θ, 4θ, and 5θ. In FIG. 11, the basic wave 1θ is set to 100%, the other frequency component is expressed as its ratio for the basic wave 1θ. The spatial frequency component 2θ that is about twice as high as the spatial frequency of the basic wave 1θ is higher than the other spatial frequency component. The spatial frequency components of even multiples of the spatial frequency of the basic wave 1θ can be removed based on the expressions (1) and (2) when the spatial frequency of the basic wave perfectly accords with a reciprocal number of 1024 µm that is a pitch of the scale 10. This is because each of pairs of the sine wave signals S(A+) and S(A−) and the sine wave signals S(B+) and S(B−) spatially has a phase shift of 180°. In other words, where the basic wave 1θ is set to sin θ, the signal having the spatial frequency component of an even multiple of the spatial frequency of the basic wave 1θ satisfies S(A+)=sin(2nθ)=sin(2nθ+180°)=S(A−). Hence, the sine wave signals S(A+) and S(A−) are cancelled out by using the expression (1). Similarly, the sine wave signals S(B+) and S(B−) are cancelled out.

However, actually, a magnification error occurs due to a mounting height shift between the light source 201 and the detection element array 202 and an inclination in the X axis between the sensor 20 and the scale 10, and a spatial frequency of the signal reaching the detection element array 202 shifts. Hence, the spatial frequency of the basic wave 1θ is less likely to perfectly accord with the reciprocal number of the pitch of the pattern 103 in the scale 10. When the A-phase signal S(A) and the B-phase signal S(B) contain a signal having the spatial frequency component other than the basic wave 1θ, the linearity of the phase φ calculated based on the expression (10) lowers or the accuracy lowers. Thus, the particularly significant influence of the spatial frequency component 2θ needs to be considered in the spatial frequency components other than the basic wave 1θ.

Figure 12:
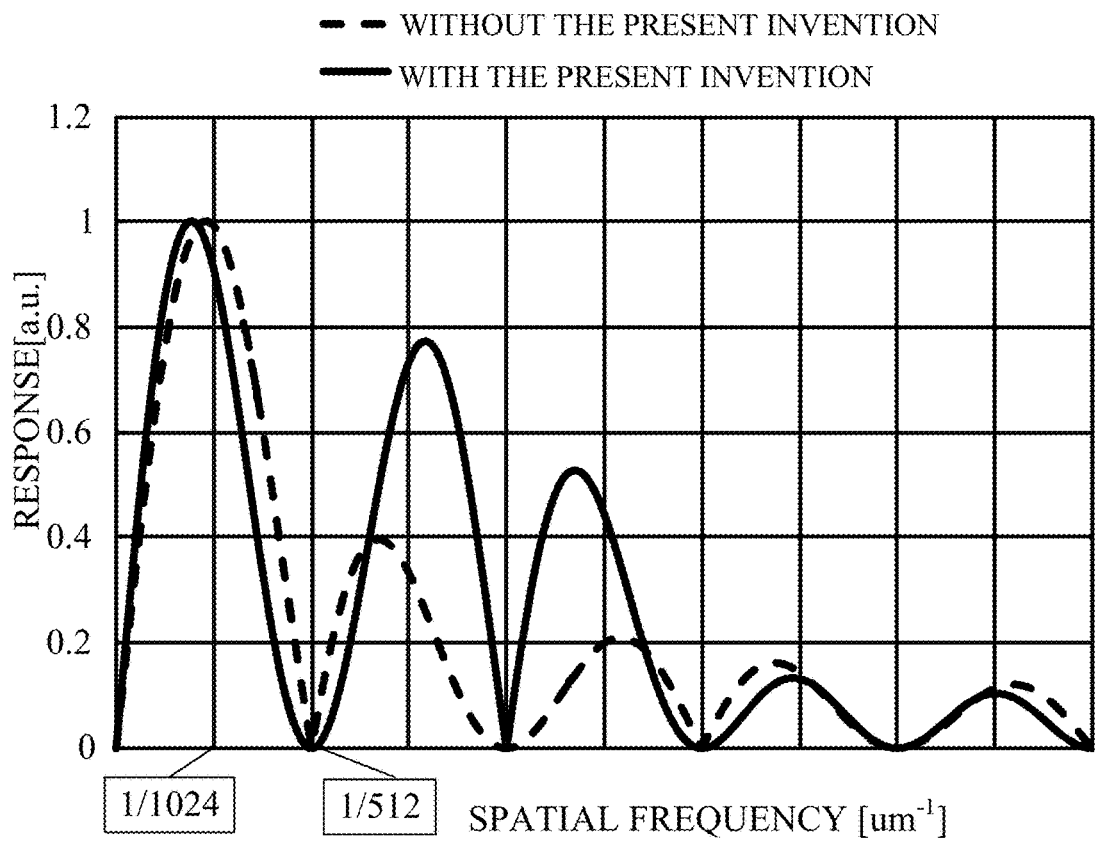
FIG. 12 illustrates a spatial frequency response characteristic of a detection element array.

FIG. 12 illustrates spatial frequency response characteristics of the detection element array 202 according to this embodiment (that executes the present invention) and the comparative example (that does not execute the present invention). This embodiment restrains the spatial frequency response in a range that contains the spatial frequency (1/512 µm) that is twice as high as the spatial frequency (1/1024 µm) of the basic wave 1θ in comparison with the comparative example.

Referring now to FIGS. 7A and 7B, a description will be given of why the spatial frequency component 2θ can be restrained that is about twice as high as the spatial frequency of the basic wave 1θ. Referring to FIG. 7A, address a phase of the signal having the spatial frequency of 1/512 µm that is set to sin θ. In FIG. 7A, where there is no magnification error, the signals with the spatial frequency of 1/512 µm on the detection elements 2022 and 2024 have phases of −270° and 90°, respectively. Since)sin(−270°) is equal to sin (90°), the sine wave signals S(B+) and S(−B) can be cancelled out based on the expression (2). On the other hand, in FIG. 7A, where there is a magnification error and Δ is an angular shift caused by the magnification error, the phases of the signals having the spatial frequency of 1/512 µm on the detection elements 2022 and 2024 are −270°+3Δ and 90°+Δ, respectively. For simplicity purposes, where the angular shift Δ is set to 1°, the phases of the signals having the spatial frequency of 1/512 µm on the detection elements 2022 and 2024 are 273° and 91°. Since sin(−273°) is equal to sin(87°) and is not equal to sin (91°), the differential residual occurs due to the expression (2).

In FIG. 7B, where there is a magnification error, the sine wave signals S(B+) and S(B−) are))sin(−273°)+sin(−91°) and sin(91°)+sin(273°). sin(−273°)+sin(−91°) can be rewritten to sin(87°)+sin(269°). Thus, in FIG. 7A, the sine wave signals S(B+) and S(B−) have angular shifts ±3° and ±1°, respectively. On the other hand, in FIG. 7B, since both the sine wave signals S(B+) and S(B−) have angular shifts ±3° and ±1°, respectively, the differential residual caused by the phase deviation can be mitigated in the differential calculation in the expression (2).

Figure 13:
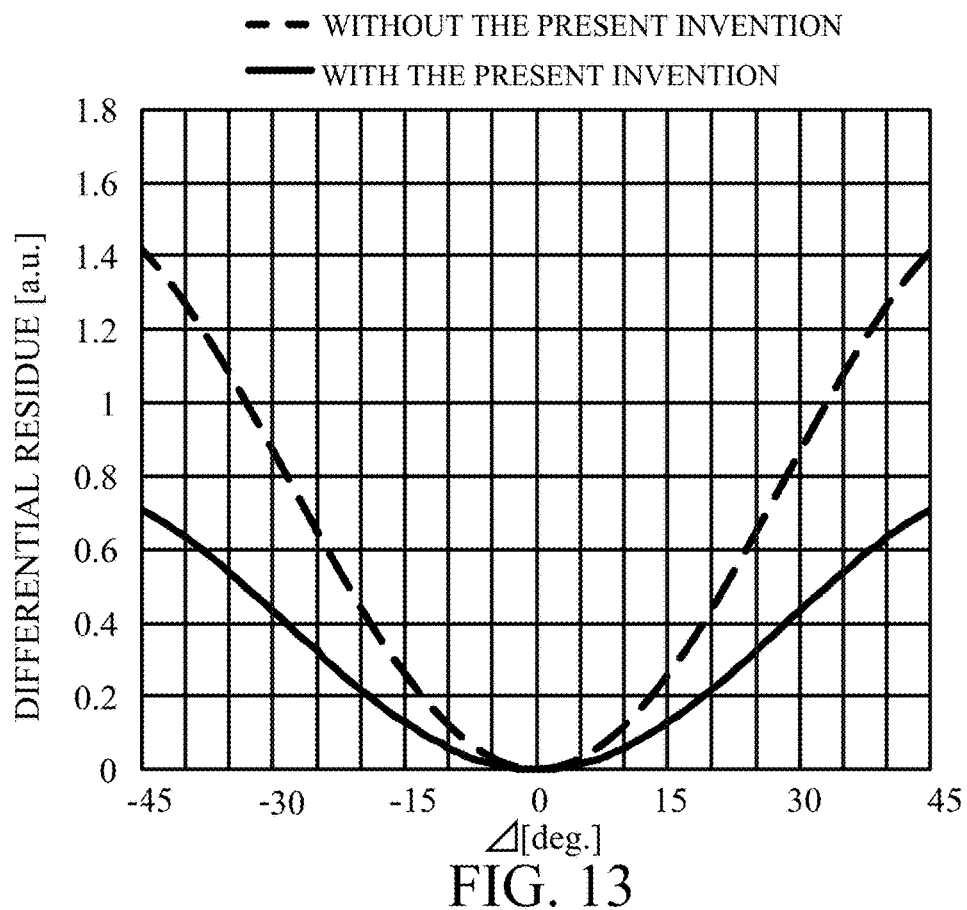
FIG. 13 illustrates a signal error characteristic caused by a magnification error.

FIG. 13 illustrates the differential residual characteristics of the signals having the spatial frequency of 1/512 µm in the differential calculation with the expressions (1) and (2). As illustrated in FIG. 13, the present invention can reduce the differential error in comparison with no present invention executed.

This embodiment can provide an accurate encoder that is less subject to the signal intensity distribution and the error caused by the signal of the spatial frequency that is about twice as high as the spatial frequency of the basic wave where the magnification error occurs.

While this embodiment describes the reflection type of optical encoder, the present invention is not limited to this embodiment. The present invention is applicable to a transmission type of optical encoder and a magnetic encoder.

Second Embodiment

Figure 14:
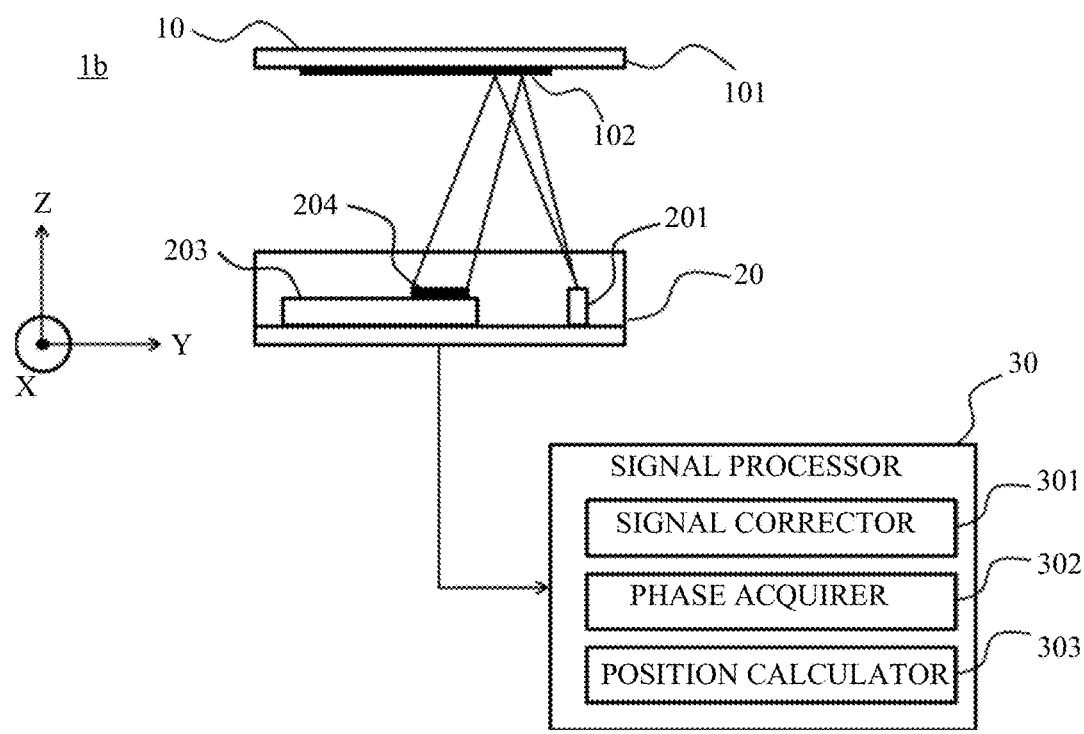
FIG. 14 illustrates a structure of an encoder according to a second embodiment.

FIG. 14 illustrates a structure of an encoder 1b according to this embodiment. The structures of the scale 10 and the signal processor 30 are similar to those of the first embodiment, and a description thereof will be omitted. The light source 201 and the light receiving element 203 in the sensor 20 have similar structures to those of the first embodiment, and a description thereof will be omitted. The sensor 20 according to this embodiment has a detection element array (light receiver) 204 instead of the detection element array 202 according to the first embodiment.

Figure 15:
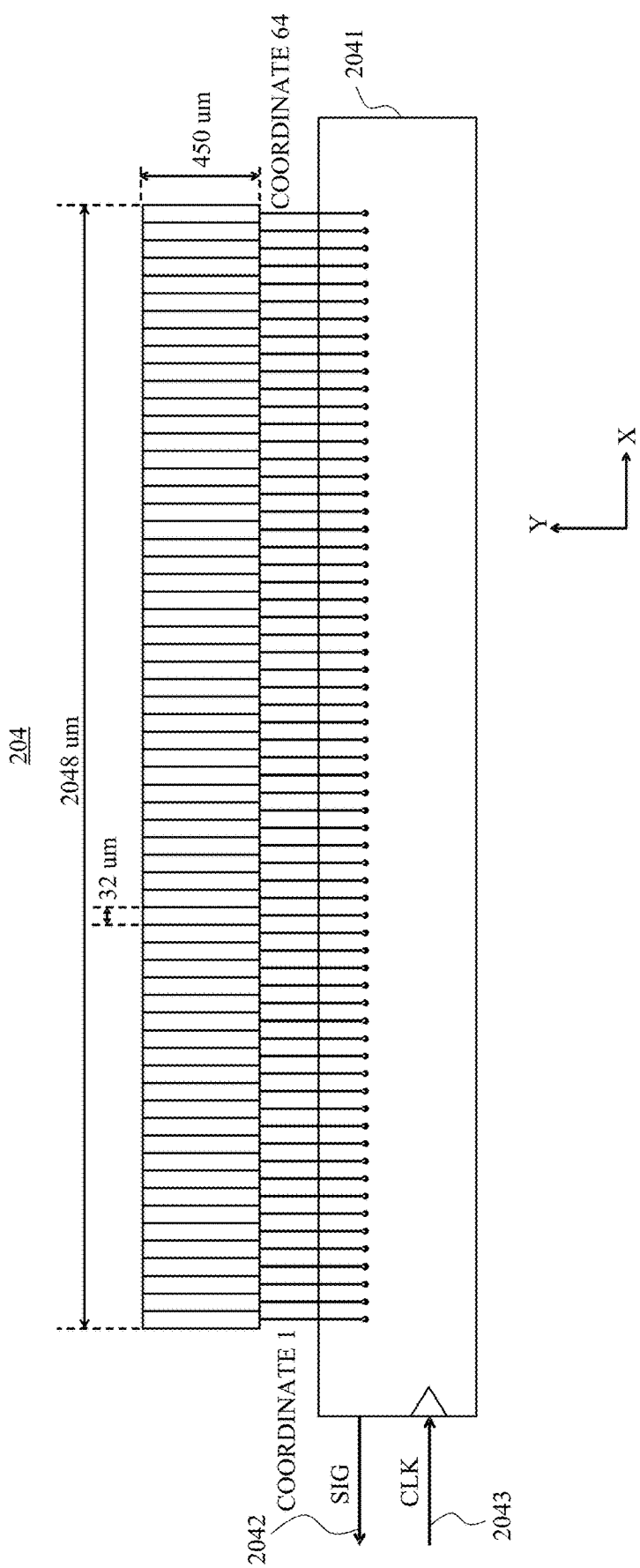
FIG. 15 illustrates a structure of a detection element array according to the second embodiment.

FIG. 15 illustrates a structure of the detection element array 204. In this embodiment, the detection element array 204 is 2048 µm long in the X direction, and 450 µm long in the Y direction. The detection element array 204 includes a plurality of (64 in this embodiment) detection elements having a length of 32 µm in the X direction. Each detection element is connected to a controller 2041. The controller 2041 includes a signal line 2042 and a clock line 2043.

The clock line 2043 is an active blow signal, and usually fixed to a high level. In detecting the reflected light from the scale 10, the clock line 2043 sends a trailing signal from the high level to the low level to the controller 2041. When the controller 2041 receives this signal from the clock line 2043, the controller 2041 stores electric charges of the respective detection elements. Whenever the controller 2041 receives a leading signal from the clock line 2043, the controller 2041 sends the electric charges of the respective detection elements to the signal processor 30 via the signal line 2042. The controller 2041 sends the electric charges of the detection elements at the left end (with coordinate 1) in FIG. 15 in response to the initial leading edge, and the neighboring electric charges of the detection element in response to the next leading edge (with coordinate 2). The controller 2041 repeats this procedure, and sends the electric charges of the detection elements at the right end (with coordinate 64) in response to the 64-th leading edge. The signal processor 30 sends the clock signal to the controller 2041, and sequentially takes the signal value of the detection element sent from the controller 2041 through the unillustrated A/D converter. Assume that the signal values for each detection element taken by the signal processor 30 are Sig1 to Sig64, where Sig1 is a signal with the coordinate 1 and Sig64 is a signal with the coordinate 64 in FIG. 15.

The signal processor 30 performs combination processing (additions caused by the digital signal processing) of the signals Sig1 to Sig64. The signal processor 30 can acquire the signals S(A+), S(B+), S(A−), and S(B−) similar to the first embodiment through the combination processing with the following expressions (12) to (15):

$$S(A+) = \Sigma_{n=41}^{8} \text{Sign} + \Sigma_{n=57}^{8} \text{Sign} \tag{12}$$

$$S(B+) = \Sigma_{n=1}^{8} \text{Sign} + \Sigma_{n=17}^{8} \text{Sign} \tag{13}$$

$$S(A-) = \Sigma_{n=9}^{8} \text{Sign} + \Sigma_{n=25}^{8} \text{Sign} \tag{14}$$

$$S(B-) = \Sigma_{n=33}^{8} \text{Sign} + \Sigma_{n=49}^{8} \text{Sign} \tag{15}$$

The signal processor 30 may generate the signals S(A+), S(B+), S(A−), and S(B−) without using the expressions (12) to (15). In a system in which the signal intensity is higher at the central part and lower at the periphery part, the total number of electric charges of the detection elements at the center is made smaller and the total number of electric charges of the detection elements at the periphery is made more. It is noted that the electric charges of the detection elements used for the combination processing are independent for the signals S(A+), S(B+), S(A−), and S(B−). It is also noted that the signals S(A+), S(B+), S(A−), and S(B−) have the total of the electric charges of the same number of detection elements. It is noted that the divided value in the phase difference correction by the signal corrector 301 and the removal ratio of the signal component of the spatial frequency that is about twice as high as the spatial frequency of the basic wave change according to the weights of the first and second terms in the expressions (12) to (15). While the distributions of the A+ phase, the B+ phase, the A− phase, and the B− phase are determined on the detection element array 202 in the first embodiment, the reduction ratio of the signal offset caused by the influence of the signal intensity and the removal ratio of the signal component of the spatial frequency that is about twice as high as the spatial frequency of the basic wave have fixed values. This embodiment can use a variable value for an optimal value according to these situations. The following procedures are similar to those of the first embodiment, and a description thereof will be omitted. Similar to the first embodiment, the structure of this embodiment is applicable to the transmission type of optical encoder and the magnetic encoder.

Third Embodiment

Figure 16:
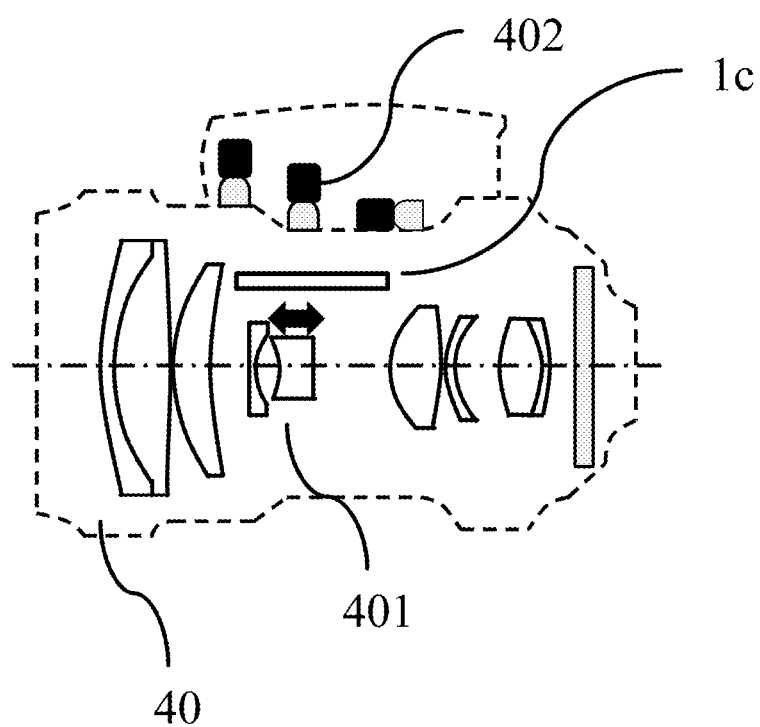
FIG. 16 is a sectional view of an image capturing apparatus having an encoder according to a third embodiment of the present invention.

FIG. 16 is a sectional view of an image capturing apparatus 40 having an encoder 1c according to the present invention. The image capturing apparatus 40 includes a focus lens 401 and a control CPU 402. The encoder 1c is attached to the focus lens 401, and serves as a detector for controlling forward and backward movements of the focus lens 401 illustrated by an arrow. The control CPU 402 sends a position request signal to the encoder 1c. When the encoder 1c receives the position request signal, the encoder 1c sends the position information to the control CPU 402. The control CPU 402 controls the focus lens 401 based on the position information of the encoder 1c and the abnormal detection information. The control CPU 402 receives the position information from the encoder 1c and moves the focus lens 401 to the target in-focus position. The control CPU 402 repeats the above operations until the focus lens 401 reaches the target in-focus position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120301, filed on Jun. 20, 2017, which is hereby incorporated by reference herein in its entirety.

What is claimed is:

1. An encoder comprising:
   a scale having a pattern column with a plurality of patterns for periodically changing a physical characteristic;
   a detection element array disposed movable relatively to the scale and including a plurality of detection elements configured to detect light from the pattern column are arranged in a moving direction;
   a signal processor configured to convert an output signal from the detection element array into position information,
   wherein the detection element array includes first detection elements, second detection elements, third detection elements, and fourth detection elements,
   wherein the first to fourth detection elements are arranged in order of the first detection elements, the second detection elements, the first detection elements, the second detection elements, the third detection elements, the fourth detection elements, the third detection elements, and the fourth detection elements, and
   wherein the signal processor generates a first signal based on an output signal from the first and third detection elements and a second signal based on an output signal from the second and fourth detection elements.

2. The encoder according to claim 1, wherein each of the first to fourth detection elements includes a plurality of detection elements that are electrically connected to each other.

3. The encoder according to claim 1, wherein the first to fourth detection elements are realized through an analog-to-digital conversion of the output signal from the detection element at the signal processor and through an addition.

4. The encoder according to claim 1, wherein the signal processor includes a corrector configured to correct a phase difference between the first signal and a second signal.

5. An image capturing apparatus comprising an encoder, wherein the encoder includes:
a scale having a pattern column with a plurality of patterns for periodically changing a physical characteristic;
a detection element array disposed movable relatively to the scale and including a plurality of detection elements configured to detect light from the pattern column are arranged in a moving direction;
a signal processor configured to convert an output signal from the detection element array into position information,
wherein the detection element array includes first detection elements, second detection elements, third detection elements, and fourth detection elements,
wherein the first to fourth detection elements are arranged in order of the first detection elements, the second detection elements, the first detection elements, the second detection elements, the third detection elements, the fourth detection elements, the third detection elements, and the fourth detection elements, and
wherein the signal processor generates a first signal based on an output signal from the first and third detection elements and a second signal based on an output signal from the second and fourth detection elements.

* * * * *